(12) United States Patent
Togami et al.

(10) Patent No.: US 7,559,704 B2
(45) Date of Patent: Jul. 14, 2009

(54) HORSESHOE SPRING FOR SECURING AN OPTICAL NOSEPIECE DURING OPTICAL ALIGNMENT

(75) Inventors: Chris Togami, San Jose, CA (US); James Stewart, Burlingame, CA (US)

(73) Assignee: Finisar Corporation, Sunnyvale, CA (US)

( * ) Notice: Subject to any disclaimer, the term of this patent is extended or adjusted under 35 U.S.C. 154(b) by 19 days.

(21) Appl. No.: 11/697,242

(22) Filed: Apr. 5, 2007

(65) Prior Publication Data
US 2007/0237466 A1  Oct. 11, 2007

Related U.S. Application Data

(60) Provisional application No. 60/789,325, filed on Apr. 5, 2006.

(51) Int. Cl.
G02B 6/36 (2006.01)
(52) U.S. Cl. ............................ 385/92; 385/88
(58) Field of Classification Search .................. 385/88, 385/92
See application file for complete search history.

(56) References Cited

U.S. PATENT DOCUMENTS

| 5,117,476 | A | * | 5/1992 | Yingst et al. ................... 385/88 |
| 7,121,742 | B2 | * | 10/2006 | Oki .............................. 385/92 |
| 2005/0158052 | A1 | * | 7/2005 | Larson ........................ 398/135 |
| 2005/0286839 | A1 | * | 12/2005 | Yoshikawa .................... 385/92 |

* cited by examiner

*Primary Examiner*—Sung H Pak
(74) *Attorney, Agent, or Firm*—Workman Nydegger

(57) ABSTRACT

A system for retaining an optical subassembly in a shell of a communications module is disclosed. The system reduces stress imposed on a hermetic package of the optical subassembly during lead interconnection procedures while ensuring thermal contact of the package with a thermal pad mounted in the shell. In one embodiment, the system includes a spring clip comprising a head portion that defines a seating surface, as well as first and second arms. The seating surface is shaped to engage an outer surface of a nosepiece of the optical subassembly. The first and second arms extend from the head portion so as to define a "U"-shaped configuration with the head portion. The head portion is shaped so as to provide a resilient force against a flange of the nosepiece when the flange and spring clip are received in a groove defined in the shell during assembly.

22 Claims, 5 Drawing Sheets

HORSESHOE SPRING FOR SECURING AN OPTICAL NOSEPIECE DURING OPTICAL ALIGNMENT

CROSS-REFERENCE TO RELATED APPLICATIONS

This application claims the benefit of the U.S. Provisional Patent Application No. 60/789,325, filed Apr. 5, 2006, and entitled "HORSESHOE SPRING FOR SECURING AN OPTICAL NOSEPIECE DURING OPTICAL ALIGNMENT," which is incorporated herein by reference in its entirety.

BACKGROUND

1. Technology Field

The present invention generally relates to optical transceiver modules. In particular, the present invention relates to a system for securing an optical subassembly within an optical transceiver while still allowing for its interconnection with other transceiver components.

2. The Related Technology

Fiber optics technology is increasingly used for transmitting voice and data signals. As a transmission medium, light provides a number of advantages over traditional electrical communication techniques. For example, optical signals allow for extremely high transmission rates and very high bandwidth capabilities. Also, optical signals are resistant to electro-magnetic interferences that would otherwise interfere with electrical signals. Light also provides a more secure signal because it doesn't allow portions of the signal to escape from the fiber optic cable as can occur with electrical signals in wire-based systems. Light also can be conducted over greater distances without the signal loss typically associated with electrical signals on copper wire.

While optical communications provide a number of advantages, the use of light as a transmission medium presents a number of implementation challenges. In particular, the data carried by an optical signal must be converted to an electrical format when received by a device, such as a network switch. Conversely, when data is transmitted to the optical network, it must be converted from an electrical signal to an optical signal. A number of protocols define the conversion of electrical signals to optical signals and transmission of those optical, including the ANSI Fibre Channel (FC) protocol. The FC protocol is typically implemented using a transceiver module at both ends of a fiber optic cable. Each transceiver module typically contains a laser transmitter circuit capable of converting electrical signals to optical signals, and an optical receiver capable of converting received optical signals back into electrical signals.

Typically, a transceiver module is electrically interfaced with a host device—such as a host computer, switching hub, network router, switch box, computer I/O and the like—via a compatible connection port. Moreover, in some applications it is desirable to miniaturize the physical size of the transceiver module to increase the port density, and therefore accommodate a higher number of network connections within a given physical space. In addition, in many applications, it is desirable for the module to be hot-pluggable, which permits the module to be inserted and removed from the host system without removing electrical power. To accomplish many of these objectives, international and industry standards have been adopted that define the physical size and shape of optical transceiver modules to ensure compatibility between different manufacturers. For example, in 2000, a group of optical manufacturers developed a set of standards for optical transceiver modules called the Small Form-factor Pluggable ("SFP") Transceiver Multi-Source Agreement ("MSA"), incorporated herein by reference. In addition to the details of the electrical interface, this standard defines the physical size and shape for the SFP transceiver modules, and the corresponding host port, so as to insure interoperability between different manufacturers' products. There have been several subsequent standards, and proposals for new standards, including the XFP MSA for 10 Gigabit per second modules using a serial electrical interface, that also define the form factors and connection standards for pluggable optoelectronic modules, such as the published draft version 0.92 (XFP MSA), incorporated herein by reference.

Regardless of the particular form factor employed, it is of common concern in the design of transceiver modules to interconnect components residing within the transceiver module securely and accurately, while at the same time preventing damage to the components during interconnection. By way of example an optical subassembly, such as a transmitter optical subassembly ("TOSA") that houses a laser for the production of optical data signals, must form a secure electrical attachment to a printed circuit board ("PCB") when the two components are included within an optical transceiver module ("transceiver"). Most often, this electrical interconnection is achieved via a plurality of electrical leads that extend from the TOSA and are each soldered to contact pads correspondingly positioned on the PCB. Such interconnection enables electrical data signals originating with a host device with which the optical transceiver module is operatively connected to be transferred from the PCB to the TOSA laser, where they are converted to an optical data signal.

Notwithstanding the secure connection that must be achieved between it and the PCB, the TOSA further includes a nosepiece that must be precisely positioned within a port of the transceiver to enable interconnection of the nosepiece with a connectorized optical fiber. Positioning of the TOSA during assembly must be such that the TOSA is properly positioned within the port while also acceptably oriented so as to enable connection of its leads with the PCB. However, know methods for facilitating such positioning and orientation are also apt to produce unreasonable amounts of stress or strain on the TOSA structure or on the TOSA-PCB lead interconnections themselves. If such stress and strain exceeds nominal limits, breakage or misalignment of the TOSA or the lead interconnections may occur, which can result in rejection of the component or entire transceiver if detected, or in suboptimal subassembly performance if not detected.

In light of this, a need exists for an interconnection scheme between optical subassemblies and other components within a module, such as an optical transceiver module, that solves the above challenges while ensuring optimum performance of the module. In addition, the module should be implemented in a manner that meets existing standard form factors and does not interfere with other module components.

BRIEF SUMMARY

The present invention has been developed in response to the above and other needs in the art. Briefly summarized, embodiments of the present invention are directed to a system for retaining an optical subassembly in a shell of a communications module. The system reduces stress imposed on a hermetic package of the optical subassembly during lead interconnection procedures while ensuring thermal contact of the package with a thermal pad mounted in the shell.

In one embodiment, the system includes a spring clip comprising a head portion that defines a seating surface, as well as first and second arms. The seating surface is shaped to engage an outer surface of a nosepiece of the optical subassembly. The first and second arms extend from the head portion so as to define a "U"-shaped configuration with the head portion. The head portion is shaped so as to provide a resilient force against a flange of the nosepiece when the flange and spring clip are received in a groove defined in the shell during assembly.

These and other features of the present invention will become more fully apparent from the following description and appended claims, or may be learned by the practice of the invention as set forth hereinafter.

BRIEF DESCRIPTION OF THE DRAWINGS

To further clarify the above and other advantages and features of the present invention, a more particular description of the invention will be rendered by reference to specific embodiments thereof that are illustrated in the appended drawings. It is appreciated that these drawings depict only typical embodiments of the invention and are therefore not to be considered limiting of its scope. The invention will be described and explained with additional specificity and detail through the use of the accompanying drawings in which.

DETAILED DESCRIPTION OF SELECTED EMBODIMENTS

Reference will now be made to figures wherein like structures will be provided with like reference designations. It is understood that the drawings are diagrammatic and schematic representations of exemplary embodiments of the invention, and are not limiting of the present invention nor are they necessarily drawn to scale.

FIGS. 1-7 depict various features of embodiments of the present invention, which is generally directed to a retention system by which a component, such as a transmitter optical subassembly, can be secured within a module, such as an optical transceiver module, in such a way as to adequately position a portion of the transmitter optical subassembly with respect to another module component, such as a printed circuit board. Securing the transmitter optical subassembly in this manner in turn enables leads extending from the subassembly to be positioned and operably connected to the printed circuit board, while at the same time maintaining a nosepiece portion of the subassembly in a predetermined position within a port of the transceiver module.

Moreover, embodiments of the present retention system for securing the transmitter optical subassembly within the optical transceiver module are configured such that no undue stress or strain is imposed on the subassembly or its leads, thereby preserving its integrity and preventing damage thereto. Further, embodiments of the retention system are removable to allow for changeout of the transmitter optical subassembly should repair or replacement thereof be needed. In addition, the present retention system can provide enhanced shielding of electromagnetic interference ("EMI") that may otherwise escape the module, thereby reducing a potential source of EMI in the operating environment.

Note that the embodiments to be described herein focus on implementation of the present invention in an optical transceiver module. However, the invention should not be so limited, but is understood to extend to other optoelectronic and communications devices where improved component retention is desired. The optical transceiver module to be described below includes various components to enable the reception and transmission of optical signals to and from a host system that is operably connected to the transceiver. The host system can be included as a node in an optical communications network, for instance, and can employ the transceiver in communicating via optical signals with other components of the network.

1. Exemplary Operating Environment

Figure 1:
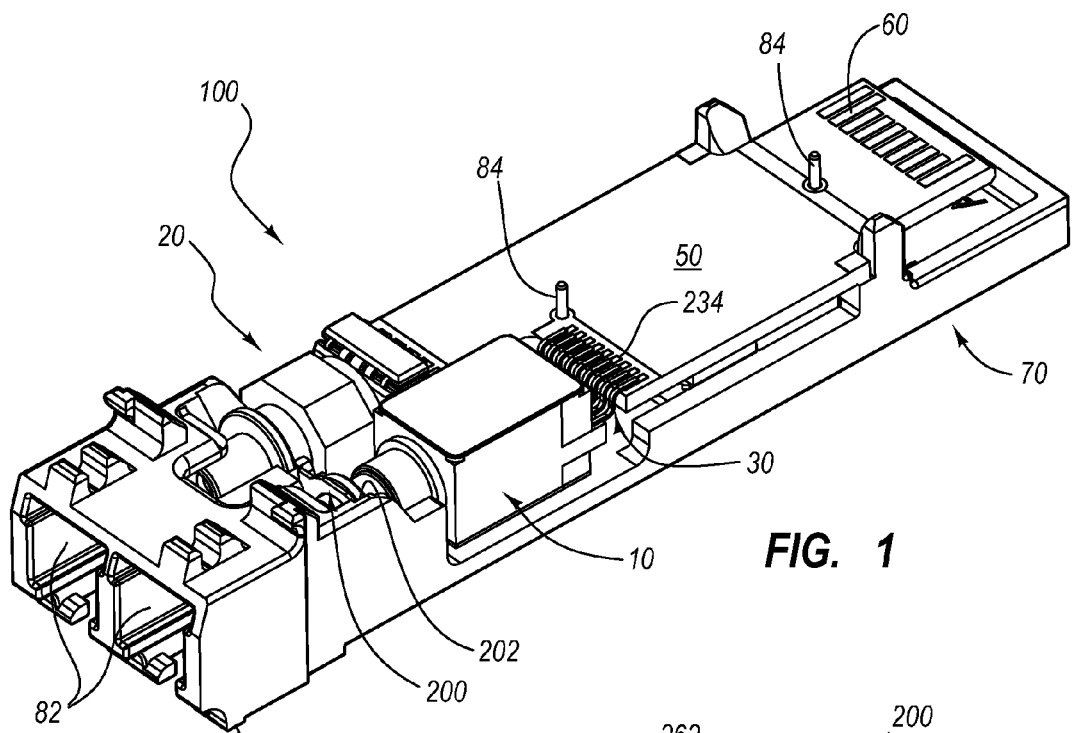
FIG. 1 is a perspective view of an interior portion of an optical transceiver module having a transmitter optical subassembly ("TOSA") that is secured in accordance with one embodiment of the present invention.

Reference is first made to FIG. 1, which depicts a perspective view of an optical transceiver module ("transceiver"), generally designated at 100, for use in transmitting and receiving optical signals in connection with an external host that is operably connected in one embodiment to a communications network (not shown). As depicted, the transceiver shown in FIG. 1 includes various components, including a transmitter optical subassembly ("TOSA") 10, a receiver optical subassembly ("ROSA") 20, electrical interfaces 30, and a printed circuit board ("PCB") 50. The electrical interfaces 30 are included to electrically connect the TOSA 10 and the ROSA 20 to a plurality of conductive pads correspondingly located on the PCB 50. Though not shown, various electronic components are also operably attached to the PCB 50.

An edge connector 60 including a plurality of conductive pads 62 is located on an end of the PCB 50 to enable the transceiver 100 to electrically interface with a host (not shown here). As such, the PCB 50 facilitates electrical communication between the TOSA 10/ROSA 20 and the host. In addition, the above-mentioned components of the transceiver 100 are partially housed within a shell 70. The shell 70 cooperates with an enclosure, shown at 300 in FIG. 4, to define a covering for the components of the transceiver 100. In the present embodiment, both the shell 70 and enclosure 300 are composed of a conductive material, such as metal.

In greater detail, the shell 70 further includes a front end 80 that defines two ports 82. Front nosepiece portions of both the TOSA 10 and the ROSA 20 each reside within corresponding volumes defined by the ports 82. The TOSA and ROSA nosepieces are positioned within the ports 82 in such a way as to facilitate their respective interconnection with corresponding connectorized optical fibers (FIG. 4) that are received by the ports.

The PCB 50 is retained within the cavity defined by the shell 70 by mounting pins 84. Alternatively, the PCB 50 can be secured to the shell 70 in other ways, including screws, adhesive, etc.

While it has been described in some detail here, the optical transceiver 100 is described by way of illustration only, and not by way of restricting the scope of the invention. For example, the optical transceiver 100 can be configured in one embodiment to be suitable for optical signal transmission and reception at one of a variety of per-second data rates, including but not limited to 1 Gbit, 2 Gbit, 4 Gbit, 8 Gbit, 10 Gbit, or higher bandwidth fiber optic links. Furthermore, the principles of the present invention can be implemented in optical transceivers of any form factor such as XFP, SFP and SFF, without restriction. Nevertheless, the transceiver 100 shown in the accompanying figures has an SFP form factor and a data rate of 2.5 Gbit/sec for use in DWDM applications, for example.

Briefly, during operation the optical transceiver 100 receives a data-containing optical signal from a fiber via the ROSA 20. The ROSA 20 acts as an opto-electric transducer by transforming the received optical signal into an electrical signal. The ROSA 20 provides the resulting electrical signal to a post-amplifier (not shown), where the signal is conditioned before being forwarded to the host device. Similarly, a data-containing electrical signal can be sent by the host device to the transceiver 100 for transmission to the communications network. The electrical signal is conditioned by a laser driver before being forwarded to the TOSA 10, where the electrical signal is converted to an optical signal and launched on to an optical fiber operably connected to the TOSA. As such, the TOSA 10 operates as an electro-optic transducer.

2. TOSA Retention System

Figure 2:
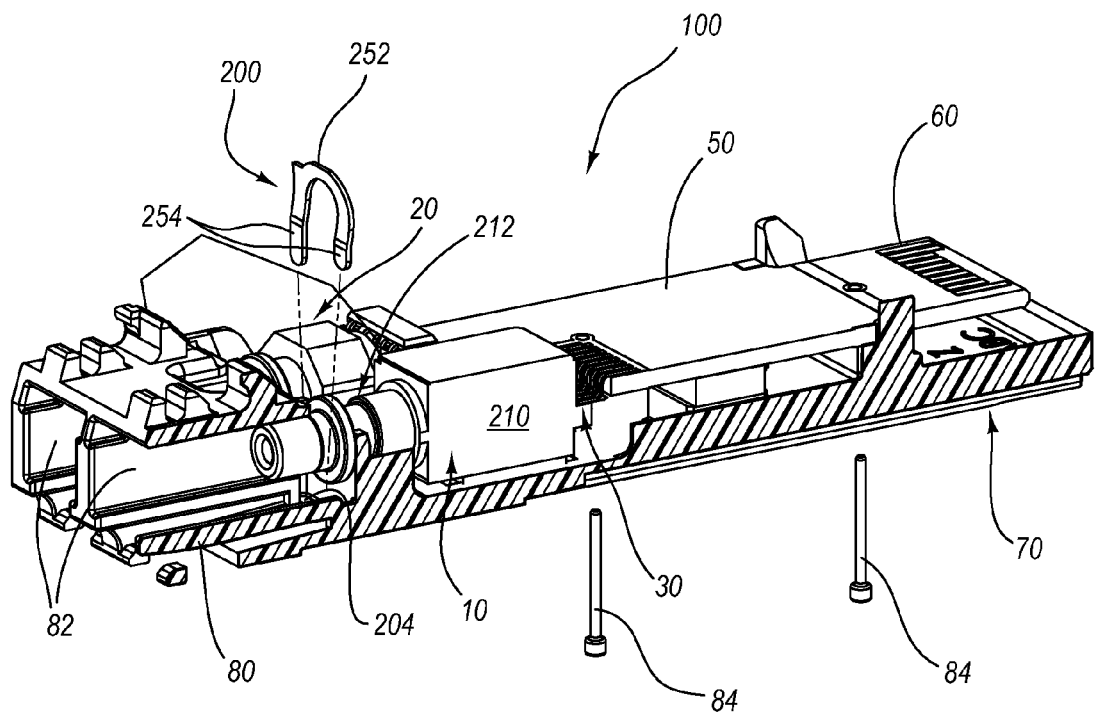
FIG. 2 is a partially exploded view of the optical transceiver module of FIG. 2, showing various elements of a system for securing the TOSA.
Figure 3:
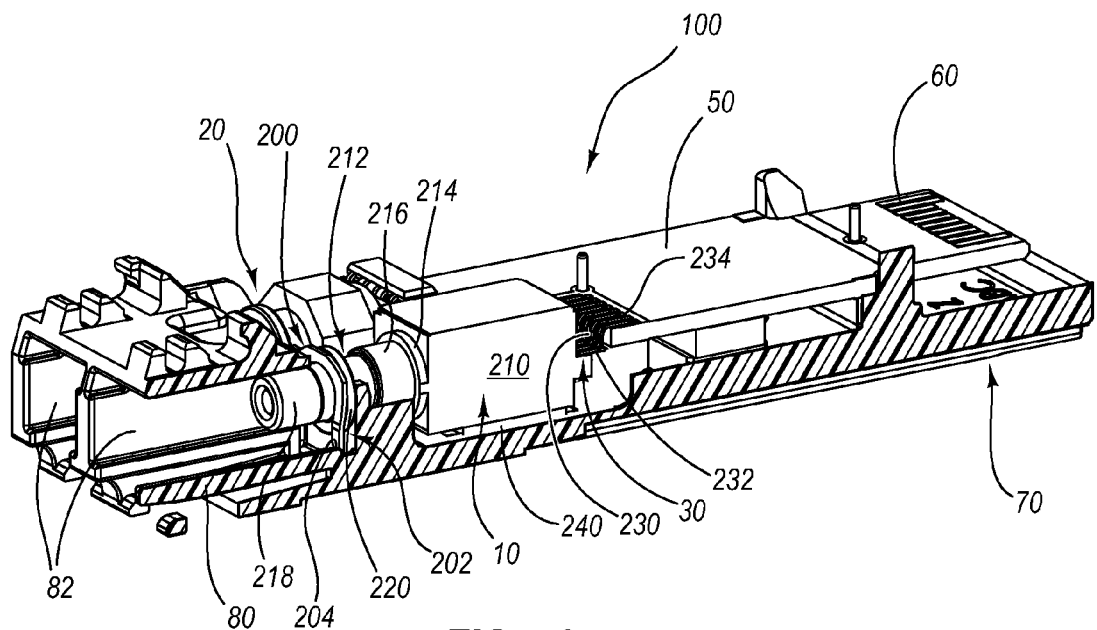
FIG. 3 is a perspective view of the system for securing the TOSA in its assembled state.

Together with FIG. 1, reference is now also made to FIGS. 2 and 3 in describing various details regarding the present invention, according to one exemplary embodiment. As shown, the transceiver 100 includes a TOSA retention system that is employed to securely retain the TOSA 10 within a portion of a cavity partially defined by the shell 70 of the transceiver 100. As has been mentioned, the TOSA retention system secures the frontal, nosepiece portion of the TOSA 10 to the shell 70 while allowing for limited repositioning of a rear connector portion of the TOSA so as to facilitate electrical interconnection between the TOSA and the PCB 50. Various details regarding these aspects of the present invention are given below.

As generally shown in FIG. 1, the TOSA retention system according to one embodiment includes a spring clip, generally designated at 200. The spring clip 200 is configured to be received by a correspondingly sized groove 202 that is defined by a portion of the shell structure that defines the shell front end 80. The spring clip 200 and groove 202 are further configured to cooperate in maintaining the TOSA 10 in a predetermined orientation so as to enable the TOSA to be electrically connected within the transceiver 100 without suffering from undue stress or strain forces and in such a way as to ensure adequate thermal contact between the TOSA and certain thermal components, as will be explained.

As best seen in FIGS. 2 and 3, the TOSA 10 is an assembly including a hermetic package 210 and a nosepiece 212 that are joined together at an assembly interface 214. As its name implies, the hermetic package 210 is a hermetically sealed container including various optoelectronic and other components used in producing an optical signal for launching onto an optical fiber, such as the connectorized optical cable (FIG. 4) that is received into the port 82. Specifically, the hermetic package 210 contains a light source, such as a laser diode or LED, for producing the optical signal. Note that, though it is shown having a particular size and configuration, the hermetic package can be shaped, sized and configured in one of a variety of ways and include various different components. For instance, the package need not be hermetic. Further, the principles described herein can be equally applied to a package for use in a ROSA or some other optical or electronic component having needs similar to those described above in connection the TOSA 10. Thus, the description contained herein is merely exemplary of the broader principles contemplated by embodiments of the present invention.

Though integrally formed in one embodiment, the nosepiece 212 can be further described as including a base portion 216 that is adjacent the assembly interface 214, a connector portion 218, and a flange 220. The connector portion 218 extends into the volume defined by the port 82 and is shaped and configured to operably mate with a connectorized optical cable received via the front opening of the port 82. Interior portions of the base portion 216 and connector portion 218 cooperate to define an optical path through which optical signals produced by the light source disposed in the hermetic portion 210 can pass for launching into the connectorized optical cable or other suitable waveguide. A suitably sized and positioned optical window (not shown) is provided in the hermetic package 210 at the assembly interface 214 to permit the optical signals to pass from the hermetic package to the optical path.

The flange 220 of the nosepiece 212 is defined between the base portion 216 and the connector portion 218 and extends radially outward a predetermined distance. So configured, the flange 220 acts as a reference point for securing the position of the TOSA 10 within the shell 70. In particular, the flange 220 is configured in the illustrated embodiment to cooperate with the spring clip 200 in securing the TOSA position, as will be described. Note that the particular shape and position of the flange can be modified from what is explicitly shown herein while still residing within the claims of the present invention.

The end of the hermetic package 210 opposite the assembly interface 214 includes portions of the electrical interface 30 for electrically connecting the TOSA 10 to the PCB 50. In detail, a plurality of conductive leads 230 are shown extending between and attached to corresponding conductive contact pads 232 of the hermetic package 210 and contact pads 234 of the PCB, best seen in FIG. 7. The leads 230 are generally "S"-shaped so as to extend between the non-level contact pads 232 and 234. Attachment of the leads 230 to both the contact pads 232 and 234 is accomplished via soldering, though other attachment methods could also be used.

It is especially important that the interconnection of the leads 230 between the hermetic package of the TOSA 10 and the PCB 50 be established such that inadvertent disconnection is unlikely and that potential for stress imposition on the leads is reduced or eliminated so as to avoid lead connection failure during transceiver operation. It is further important that the TOSA 10 be maintained in a substantially fixed position during such lead interconnection such that a cohesive bond is formed between the leads 230 and the contact pads 232 and 234. Note here that other electrical lead interconnection structures and schemes can be employed between the TOSA and the PCB. However, regardless of the particular lead interconnection scheme used, the importance of maintaining the TOSA in a relatively fixed position during such lead interconnection remains generally important. Thus the principles of the present invention apply to other lead interconnection schemes not explicitly shown here.

Figure 7:
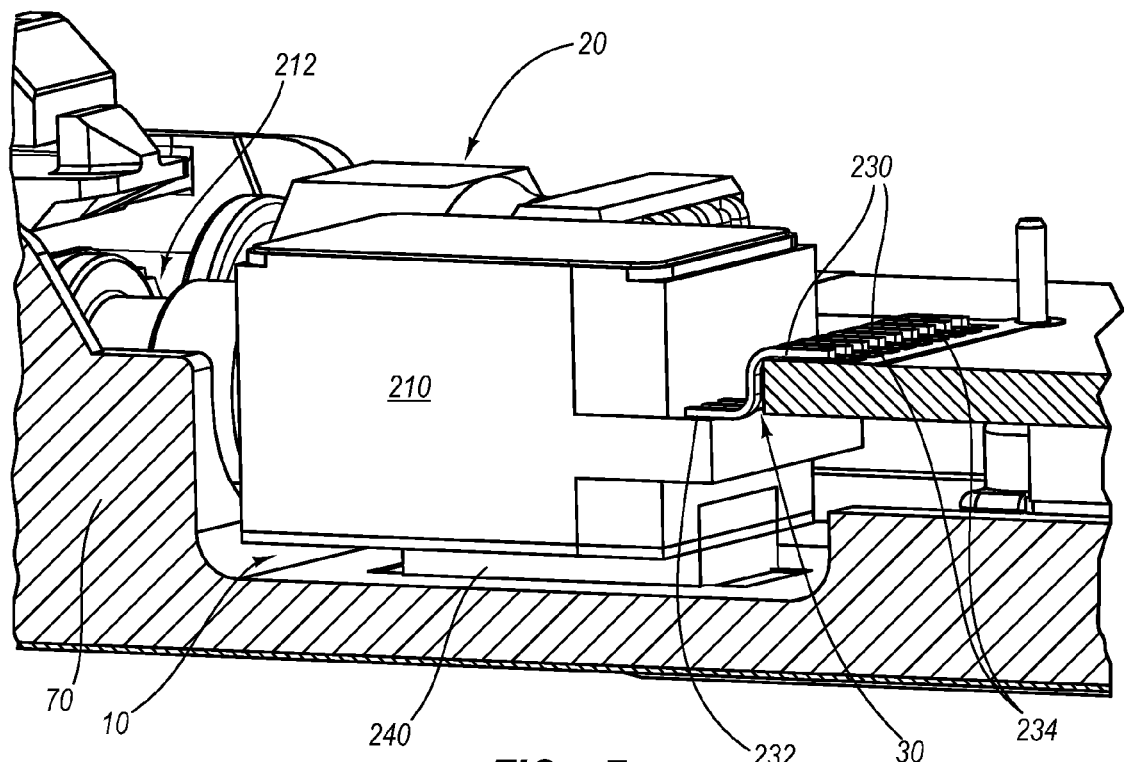
FIG. 7 is a partial cutaway view, showing various additional details of the optical transceiver module of FIG. 3.

As seen in FIG. 7, a thermal pad 240 is interposed between the hermetic package 210 of the TOSA 10 and an interior surface of the shell 70 so as to facilitate the removal of heat from the TOSA during module operation. In the present embodiment, the thermal pad 240 is compliant so as to be compressed between an adjacent surface of the hermetic package 210 and the shell interior surface. In other embodiments, an adhesive could be used to secure the thermal pad.

As was discussed in connection with the leads 230, it is important to maintain the TOSA hermetic package 210 in a fixed position during assembly such that a secure engagement of the thermal pad 240 with the hermetic package surface is achieved, thereby providing a suitable thermal path from the TOSA to the shell 70, where the heat can then be dissipated. Moreover, it is important to maintain adequate contact of the thermal pad 240 with the hermetic package 210 during the entire operational lifetime of the module 100 so as to preserve an adequate heat path that does not change over time. Movement or vibration of the TOSA 10 within the shell 70 during module operation, however, can jeopardize this continual contact by causing the thermal pad to become detached from the TOSA 10.

In accordance with embodiments of the present invention, the TOSA retention system is configured to meet the TOSA retention requirements as explained above, that is, retention of the TOSA in a substantially fixed position so as to enable proper attachment of the leads 230 between the hermetic package 210 and the PCB 50, as well as to prevent detachment, via vibration or other cause, of the hermetic package 210 from the thermal pad 240 or other suitable heat transfer device. Moreover, the TOSA retention system described in connection with embodiments disclosed herein secures the TOSA without imposing undue stress or strain on TOSA components, portions, or structures, so as to prevent damage thereto during lead or thermal pad interconnection.

As already mentioned, the TOSA retention system according to illustrated embodiments herein includes the spring clip 200. As best shown in FIG. 2, the spring clip 200 is configured to seat within the recessed groove 202 defined in the front end 80 of the shell 70 so as to secure and retain the TOSA 10 within a corresponding volume defined in part by the shell.

Figure 1A:
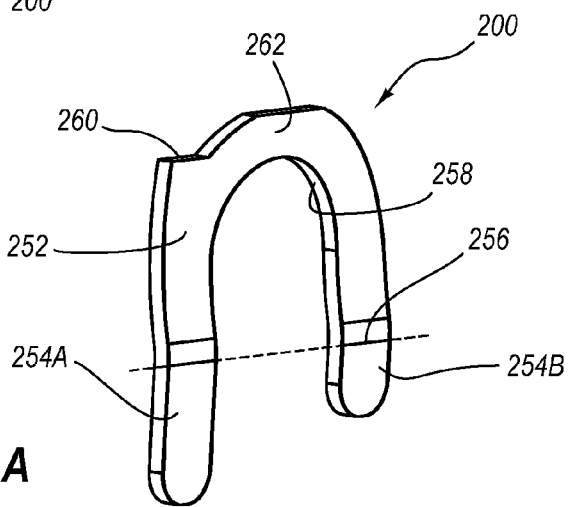
FIGS. 1A-1C are various views of a spring clip employed in securing the TOSA of FIG. 1, according to one embodiment.
Figures 1B, 1C:
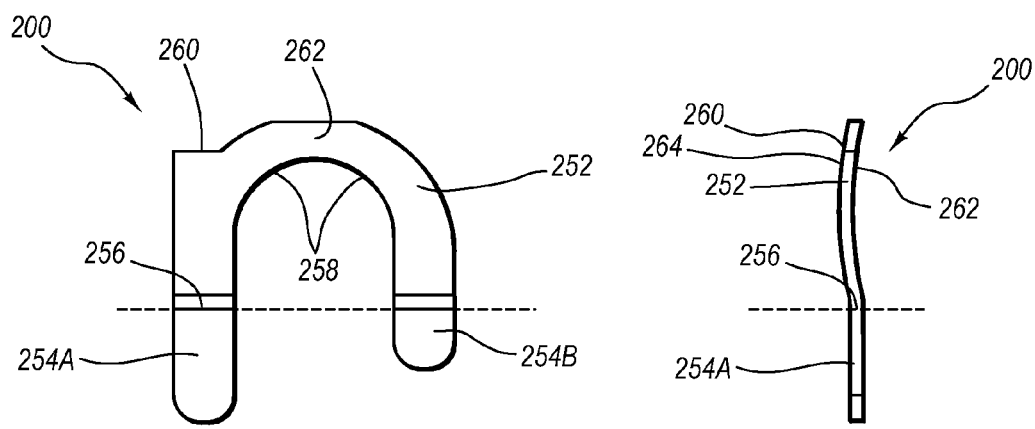

FIGS. 1A-1C show the spring clip 200 in greater detail. Particularly, the spring clip 200 in the present embodiment is generally configured in a "U," or horseshoe shape, and as such includes a head portion 252 and two arms 254A and 254B extending from either side of the head portion. A head/arm interface 256 defines the region of union between the head portion 252 and arms 254. An inner surface of the head portion 252 defines a seating surface 258. The seating surface 258 is configured to seat against a portion of the nosepiece 212 when the spring clip in installed into the transceiver 100, as is described below. The head portion 252 further includes a flat-shaped tab portion 260 for use in assisting placement of the spring clip 200 with the proper orientation in the transceiver 100.

Note that the arm 254A of the spring clip 200 is relatively longer than the arm 254B. This is to accommodate the particular shape of the groove 202 and to ensure proper orientation of the spring clip 200 when it is installed. If the spring clip 200 were to be installed with the arms 254A and 254B reversed, the spring clip 200 would not completely seat in the groove 202 about the connector portion 218, and would also prevent the enclosure from sliding on to the shell 70 in the manner seen in FIG. 4.

Figure 5:
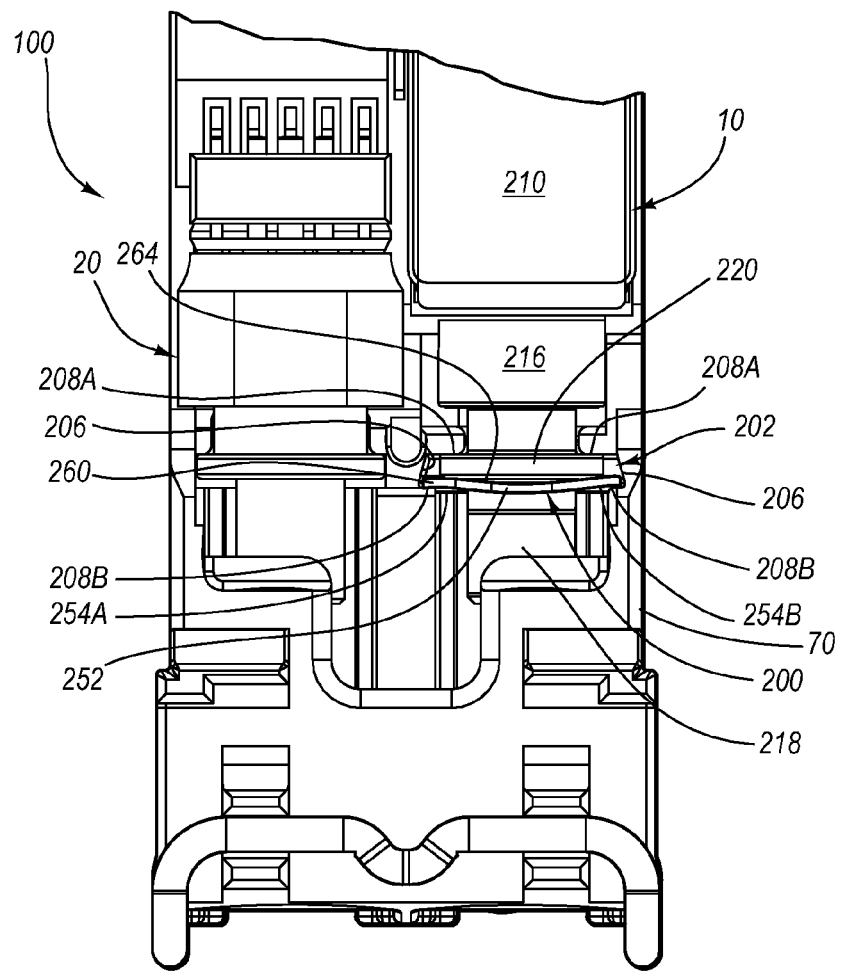
FIG. 5 is a top view of the assembled optical transceiver module of FIG. 3, showing placement of the spring clip with respect to an optical subassembly, in accordance with one embodiment.

The spring clip 200 includes a proximal surface 262 shown in FIG. 1B, and an opposing distal surface 264 (FIG. 1C). As best seen in FIG. 1A, 1C and FIG. 5, the spring clip 200 is shaped such that the portion of the proximal surface 262 defined by the head portion 252 defines a cupped, or concave, surface. In contrast, the arms 254A, 254B are not so shaped. This shaping enables the spring clip to desirably secure the TOSA assembly 10. Further, the spring clip 200 is composed of a resilient material, such as spring steel, plastic, or other suitable material or material composition, in order to assist placement of the spring clip with respect to the TOSA assembly 10 in the shell 70.

Figure 6:
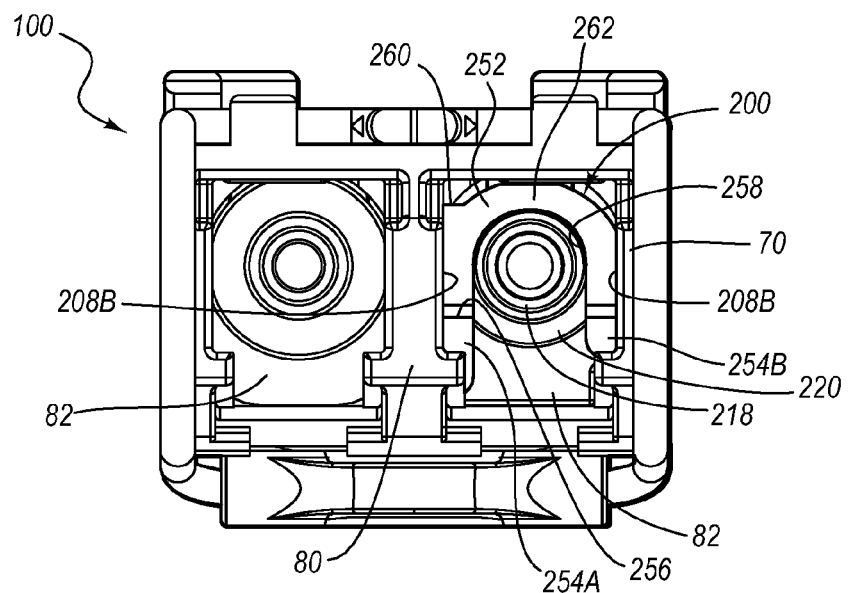
FIG. 6 is an end view of the optical transceiver module of FIG. 3, showing placement of the spring clip with respect to an optical subassembly, in accordance with one embodiment.

Reference is now made to FIGS. 3, 5, and 6. Each of these figures shows the spring clip 200 positioned in the module 100 so as to retain the TOSA 10 in a predetermined orientation and position, in accordance with embodiments of the present invention. So positioned, the spring clip 200 is received within the recessed groove 202. In particular, the groove 202 is defined as a generally U-shaped structure, having a bottom channel 204 in physical communication with two side channels 206. The spring clip 200 is received into the groove 202 such that portions of the clip arms 254A and 254B are substantially received in the groove side channels 206 and such that the terminal tip of each clip arm is received into the base channel 204.

When fully seated in the groove 202, the spring clip 200 engages the nosepiece 212 of the TOSA 10 about a portion of the cylindrical connector portion 218, as best shown in FIG. 5. Further, the spring clip 200 seats adjacent to the flange 220, which is also received in the groove 202. Because of its curvature as described above, the spring clip 200 resiliently deforms when it is inserted into the groove 202 about the TOSA nosepiece connector portion 218 resulting in a net "spring force." This spring force imparted by the spring clip 200 causes a friction fit between the groove 202 and the spring clip, thereby urging the spring clip against the flange 220. This urging force in turn causes the flange 220 to seat against surfaces 208A of the groove bottom and side channels 204, 206, thereby securing the TOSA 10 in a predetermined and desired position within the module 100. Note also that the above engagement causes portions of the spring clip proximal surface 262 to seat against surfaces 208B of the groove bottom and side channels 204, 206. As such, it is seen that the groove 202 is accurately sized so as to allow such engagement.

The spring clip 200 can secure the position of the TOSA 10 within the shell 70 once the TOSA position has been established. In one embodiment, the desired TOSA position is determined by first placing the TOSA and thermal pad 240 in the shell 70 in the general orientation shown in FIG. 2, such that the flange 220 of the nosepiece 212 is received within the groove 202 and the TOSA connector portion 218 is disposed within the respective port 82. An alignment device, such as a port gauge (not shown), is then inserted into the port 82 and is mated with connector portion 218 of the TOSA nosepiece 212. The port gauge aligns the connector portion and, by extension, the rest of the TOSA 10 in an x-y plane perpendicular to the direction of light emission from the optical path opening at the end of the connector portion, which is in the z-direction. The x-y position of the nosepiece connector portion 218 within the port 82 is typically standardized across transceivers of a certain type or model.

Once the proper x-y position of the TOSA nosepiece connector portion 218 has been set, the spring clip 200 is inserted about the connector portion into the groove 202 until the seating surface 258 seats on the cylindrical surface of the connector portion, while the connector portion is maintained in its set x-y position. The engagement of the spring clip 200 with the outer cylindrical surface of the connector portion 218 is such that a normal, or interference, fit is created therebetween by virtue of the spring force exerted by the spring clip. This, together with the interference fit achieved between the spring clip 200 and the groove 202, enables the spring clip to secure the desired x-y position of the connector portion 218 of the TOSA nosepiece 212 within the port 82, as already described. By virtue of engagement of the spring clip 200, the nosepiece connector portion 218 is also fixed in the light propagating z-direction.

Note that the spring clip seating surface and nosepiece connector portion can define complementary shapes other than cylindrical, such as square for example, while still maintaining the connector portion position, as desired. Note also that the spring clip and related structures can be modified such that engagement of the clip with other portions of the TOSA/nosepiece is possible.

With the TOSA nosepiece 212 secured, the hermetic package 210 is also substantially secured with respect to both the PCB 50 and the interior surface of the shell 70. So secured, the hermetic package 210 of the TOSA 10 is positioned such that interconnection of the leads 232 of the hermetic package with the leads 234 of the PCB 50 via the leads 230, as well as thermal communication of the hermetic package with the shell 70 via the thermal pad 240 (FIG. 7), can be achieved. In particular, the TOSA 10 is maintained in position without undue stress or strain forces being imposed on portions of the TOSA where such forces can damage the structure. One example of such a location includes the rear portion of the TOSA where the leads 230 attach to the contact pads 232. Elimination of stress forces in this area prevents or lessens the occurrence of lead or contact pad damage in the electrical interface 30 between the TOSA 10 and the PCB 50.

Also, and as described earlier, retention of the TOSA by the TOSA retention system as described herein assists in ensuring continual contact between the hermetic package 210 and the thermal pad 240 by reducing vibration therebetween, a major source of thermal pad separation. In greater detail, it is noted that the TOSA assembly 10 is configured such that the connector portion 218 of the nosepiece 212 is movable through a relatively small range of movement, i.e., approximately 0.002 inch measured from the tip of the nosepiece, with respect to the inner surfaces of the respective port 82. This movement range provides a limited amount of compliance to the nosepiece, which eases the insertion and removal of fiber optic connectors into and from the port. Note that the tolerance between the fiber optic connector ferrule and the inner diameter of the nosepiece is substantially close, i.e., 3 microns of tolerance gap or less.

As such, it is necessary to provide such limited movement of the TOSA assembly nosepiece 212 while still securing the hermetic package 210 such that it maintains compressive engagement with the compliant thermal pad 240. As such, the spring clip 200 is configured such that it provides sufficient force on the TOSA assembly 10 to maintain the hermetic package 210 in compressive engagement with the thermal pad 240.

In accordance with present embodiments, the spring clip 200 is removable from engagement with the TOSA 10 so as to enable replacement of the spring clip, the TOSA, or both. Thus changeout procedures for the TOSA are substantially simplified.

Embodiments of the present invention further enhance reduction of electromagnetic interference ("EMI") emission from the transceiver. In particular, the spring clip 200 urges the TOSA nosepiece flange 220 against the groove surfaces 208A, as has been described above. This configuration helps to "seal" the transceiver front end and ensures that no spacing exists between the groove 202 and the flange 220, where EMI could otherwise escape and exit the transceiver via the ports 82 of the shell front end 80, for example. Thus, use of the spring clip 200 and the properly sized groove 202 can assist in reducing the potential for the transceiver front end in emitting potentially harmful EMI.

Figure 4:
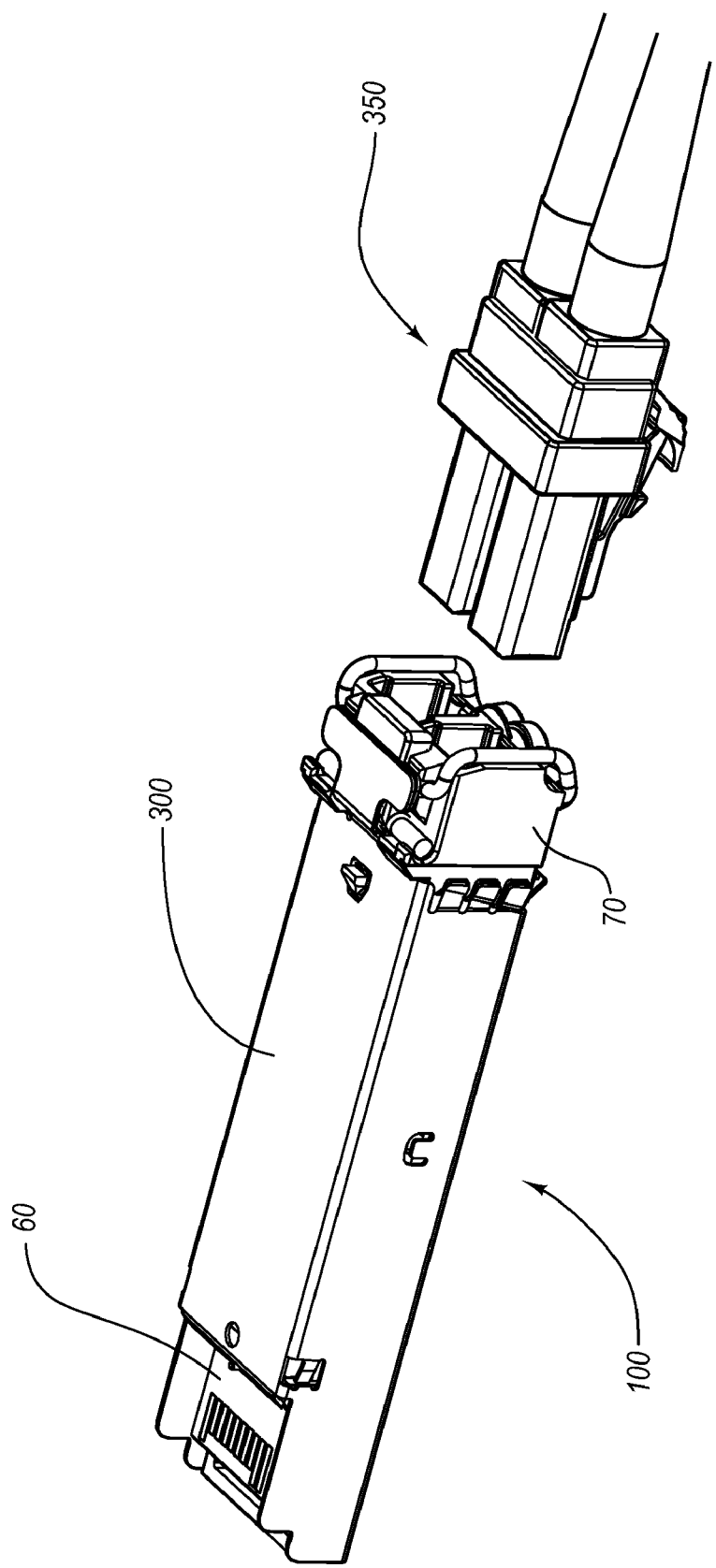
FIG. 4 is a perspective view of the assembled optical transceiver module and an optical connector configured for mating with the transceiver module.

FIG. 4 shows one manner in which an optical fiber can be coupled to the transceiver 100, wherein an optical connector 250 coupled to optical fibers is operably received by the ports 82 of the transceiver. This configuration allows optical signals to pass to and from the transceiver 100. Note also that the transceiver 100 is shown with the enclosure 300 attached to the shell to form a complete transceiver module housing.

The present invention may be embodied in other specific forms without departing from its spirit or essential characteristics. The described embodiments are to be considered in all respects only as illustrative, not restrictive. The scope of the invention is, therefore, indicated by the appended claims rather than by the foregoing description. All changes that come within the meaning and range of equivalency of the claims are to be embraced within their scope.

What is claimed is:

1. In a communications module, a system for retaining an optical subassembly in a shell of the communications module, the optical subassembly including a hermetic package coupled to a nosepiece, the nosepiece including a flange, the system comprising:
    a groove defined by a portion of the shell, the groove being located proximate the optical subassembly and configured to receive the flange of the nosepiece; and
    a spring clip for insertion in the groove so as to engage an outer surface of the nosepiece and secure the flange within the groove, wherein the spring clip is resilient and is at least partially concavely shaped resulting in a spring force urging one side of the spring clip against a surface of the flange and another side of the spring clip against a surface of the groove thereby securing the optical subassembly within the groove by a friction fit.

2. The system for retaining as defined in claim 1, wherein the nosepiece includes an end portion disposed in a port defined by the shell of the communications module.

3. The system for retaining as defined in claim 1, wherein the spring clip is composed of a resilient material and is configured to enable limited movement of the end portion of the nosepiece within the port.

4. The system for retaining as defined in claim 1, wherein the spring clip includes a seating surface that engages a correspondingly shaped portion of the nosepiece proximate the flange.

5. The system for retaining as defined in claim 4, wherein the flange is annularly defined about a cylindrical portion of the nosepiece, and wherein the seating surface of the spring clip is rounded.

6. The system for retaining as defined in claim 1, wherein the spring clip ensures that the hermetic package is thermally coupled to a thermal pad disposed on the shell.

7. The system for retaining as defined in claim 1, wherein the spring clip is removable so as to allow changeout of the optical subassembly.

8. The system for retaining as defined in claim 1, wherein the communications module is an optical transceiver module, and wherein the optical subassembly is a transmitter optical subassembly.

9. The system for retaining as defined in claim 1, wherein the spring clip secures the flange against the groove so as to create a barrier for the emission of electromagnetic interference from the communications module.

10. A method for installing a transmitter subassembly in a shell of an optical transceiver module, the transmitter assembly including a nosepiece attached to an optoelectronic package, the method comprising:
    positioning the transmitter assembly in the shell such that a flange of the nosepiece is received in a groove defined by the shell;
    placing a spring clip in the groove to secure the flange in a predetermined position such that the optoelectronic package is positioned proximate a printed circuit board of the optical transceiver module, wherein the spring clip is resilient and is concavely shaped resulting in a spring force urging one side of the spring clip against a surface of the flange and another side of the spring clip against a surface of the groove thereby securing the optical subassembly within the groove by a friction fit; and
    by a plurality of electrical leads, electrically connecting conductive features of the optoelectronic package with corresponding conductive features of the printed circuit board.

11. The method for installing as defined in claim 10, wherein placing the spring clip further comprises
    placing the spring clip in the groove to secure the flange in a predetermined position such that the optoelectronic package thermally couples with a thermal pad interposed between the optoelectronic package and the shell.

12. The method for installing as defined in claim 11, wherein the thermal pad is compliant and wherein the optoelectronic package compresses the thermal pad.

13. The method for installing as defined in claim 10, wherein the spring clip controls mechanical stress imposed on the transmitter subassembly when electrically connecting the conductive features of the optoelectronic package with the conductive features of the printed circuit board.

14. The method for installing as defined in claim 10, wherein placing the spring clip in the groove further comprises:
    placing the spring clip in the groove such that first and second arms of the spring clip engage portions of the groove.

15. The method for installing as defined in claim 10, wherein placing the spring clip in the groove further comprises:
    placing the spring clip in the groove such that a head portion of the spring clip resiliently deforms in the groove.

16. The method for installing as defined in claim 10, wherein the conductive features of the optoelectronic package are non-level with respect to the conductive features of the of the printed circuit board.

17. A spring clip for use in securing an optical subassembly in a shell of an optical transceiver module, the spring clip comprising:
    a head portion defining a seating surface, the seating surface being shaped to engage an outer surface of a nosepiece of the optical subassembly; and
    first and second arms extending from the head portion so as to define a "U"-shaped configuration with the head portion, wherein the head portion is shaped so as to provide a resilient force against a flange of the nosepiece when the seating surface engages the nosepiece outer surface, wherein the spring clip is resilient and is concavely shaped resulting in a spring force urging one side of the spring clip against a surface of the flange thereby securing the optical subassembly within a groove by a friction fit.

18. The spring clip as defined in claim 17, wherein the flange of the nosepiece is received into a groove defined by the shell, and wherein the spring clip is configured to secure the flange against the groove when the spring clip is received into the groove.

19. The spring clip as defined in claim 18, wherein the first and second arms are uneven in length.

20. The spring clip as defined in claim 19, wherein the head portion includes a flattened tab portion for use in assisting with orientation of the spring clip for placement in the shell.

21. The spring clip as defined in claim 20, wherein the head portion is resilient and is concavely shaped.

22. The spring clip as defined in claim 17, wherein the spring clip includes a single "U"-shaped configuration for securing a single optical subassembly.

* * * * *

UNITED STATES PATENT AND TRADEMARK OFFICE
CERTIFICATE OF CORRECTION

PATENT NO. : 7,559,704 B2  Page 1 of 1
APPLICATION NO. : 11/697242
DATED : July 14, 2009
INVENTOR(S) : Togami et al.

It is certified that error appears in the above-identified patent and that said Letters Patent is hereby corrected as shown below:

Column 2
Line 42, change "know" to --known--

Column 4
Line 53, remove [62]

Column 6
Line 14, change "the TOSA" to --to the TOSA--

Column 7
Line 57, change "in" to --is--

Column 10
Line 15, change "250" to --350--

Column 12
Line 13, delete 2$^{nd}$ "of the"

Signed and Sealed this

Fourteenth Day of September, 2010

David J. Kappos
*Director of the United States Patent and Trademark Office*